Feb. 21, 1961 T. M. LAAKSO ET AL 2,972,536
ANTI-STATIC QUATERNARY SALTS OF C-VINYLPYRIDINE
POLYMERS WITH HALOACETONE CYANOHYDRINS
Filed Sept. 3, 1957
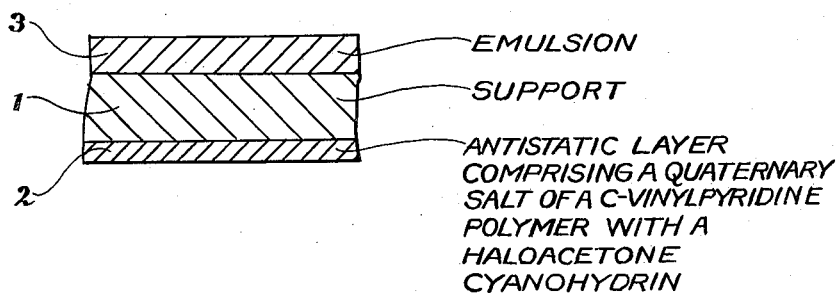
Thomas M. Laakso
Jack L.R. Williams
INVENTORS
BY R. Frank Smith
Leonard E. Brancken
ATTORNEY & AGENT United States Patent Office 2,972,536
Patented Feb. 21, 1961

2,972,536

ANTI-STATIC QUATERNARY SALTS OF C-VINYL-PYRIDINE POLYMERS WITH HALOACETONE CYANOHYDRINS

Thomas M. Laakso and Jack L. R. Williams, Rochester, N.Y., assignors to Eastman Kodak Company, Rochester, N.Y., a corporation of New Jersey Filed Sept. 3, 1957, Ser. No. 681,602

6 Claims. (Cl. 96—87)

This invention relates to vinylpyridine polymers, and more particularly to quaternary salts of C-vinylpyridine polymers with certain halocyanohydrins, to materials prepared therewith, and to processes for preparing such polymeric salts and materials.

The new class of resinous polymers of the invention are derived from C-vinylpyridine polymers by reaction with certain quaternizing agents in such proportions that the derived polymer consists of from 70 to approximately 100% by weight in linear combination of recurring quaternized units represented by the following general structure:

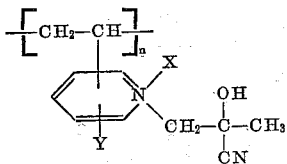

wherein $n$ represents a whole number and indicates that the group recurs $n$ times in the resin molecule, Y represents an atom of hydrogen or an alkyl group of 1 to 4 carbon atoms, e.g. methyl, ethyl, propyl, isopropyl, butyl, etc. groups, and X represents a halogen atom such as chlorine or bromine, the remainder of the polymer molecule being residual recurring C-vinylpyridine units represented by the general structure:

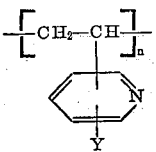

wherein $n$ and Y have the aforementioned values. The above defined quaternary salt polymers are film-forming and have numerous uses, but are particularly valuable as antistatic coatings on sheet materials such as on light-sensitive photographic films to prevent static markings thereon produced by friction is the manufacture, use and processing of the same. Each of the species coming within the above structures have their own particular characteristics as to their antistatic efficacy, but as a group they behave generally similar.

It is, accordingly, an object of the invention to provide a new class of polymeric compounds. A more specific object is to provide new polymeric salts. Another object is to provide sheet materials that are antistatic in character, and more particularly photographic films that are static resistant. Another object is to provide processes for preparing such polymeric salts and coated materials prepared therewith. Other objects will become apparent hereinafter.

In accordance with the invention, we prepare the polymeric salts of the invention by reacting a poly-C-vinylpyridine with a halogen substituted cyanohydrin such as chloroacetone cyanohydrin or bromoacetone cyanohydrin in a reaction medium such as methanol, acetone, dioxane, etc., by gentle heating and stirring in a hot water bath until the reaction is substantially completed. Advantageously, the quaternizing agent is employed in slight excess of that required for complete quaternization. The resulting product is soluble in the reaction mixture but may precipitate into a non-solvent such as diethyl ether, filtered, washed with fresh ether and dried. The solubility of the product depends on the completeness of the reaction ranging, for example, from methanol-soluble, water-insoluble for the products containing somewhat less than 70% by weight of quaternized units to methanol-soluble, water-soluble for the products containing from 70% to essentially 100% by weight of quaternized units.

The intermediate poly-C-vinylpyridines of the invention may be prepared by conventional polymerization methods wherein a monomer such as 2-vinylpyridine, 3-vinylpyridine, 4-vinylpyridine, 2-methyl-5-vinylpyridine, etc., is heated in the presence of a polymerization catalyst such as benzoyl peroxide, acetyl peroxide, hydrogen peroxide, ammonium persulfate, potassium persulfate, etc., in mass, in solution in an inert organic solvent or polymerizing in emulsion form in a non-solvent such as water, the resulting polymers being separated from the polymerization reaction mixture by conventional means such as precipitating or coagulating, filtering, washing and drying. If desired, the intermediate polymers may be copolymers of the above mentioned C-vinyl pyridines with a lesser quantity by weight of certain other polymerizable monomers such as styrene, acrylic acid esters and amides including N-alkylamides, and α-alkyl substituted acrylic esters and amides includng N-alkyl amides, e.g., methyl acrylate, methyl methacrylate, acrylamide, N-methyl acrylamide, N-methyl methacrylamide, N,N-dimethyl acrylamide, etc. However, the polymeric quaternary salts of the invention prepared from the homopolymers of C-vinylpyridines with chloroacetone cyanohydrin are preferred.

The accompanying drawing is a sectional view of a photographic film base 1 composed of a hydrophobic material such as a cellulose derivative, e.g., cellulose acetate, cellulose propionate, cellulose acetate-butyrate, cellulose nitrate, etc., a polyamide such as nylon, a polyester such as polyethylene terephthalate and the like, has coated thereon a polymeric salt of the invention as layer 2, and on the opposite side a layer 3 of a light-sensitive material, e.g., a gelatine-silver halide emulsion. The layer 2 of the polymeric salt may also have therein a substantial proportion of gelatine, if desired. Although the preferred method of employing the polymeric salts of the invention is in the form of a backing layer as shown in the drawing, the polymeric salts can also be incorporated directly in the sensitive emulsion layer or used as an overcoating layer over the sensitive emulsion layer to give antistatic properties to the photographic film. However, as indicated in the drawing, application of the polymeric salts to the back of the film, i.e., to the side opposite that of the sensitive emulsion layer, is preferred.

The following examples will serve to illustrate further the preparation of the polymeric salts of the invention and the application of the same to the product of light-sensitive films having excellent antistatic properties.

EXAMPLE 1

100 g. (0.95 mole) of poly-4-vinylpyridine [{η}=1.22] were dissolved in 1 liter of methyl alcohol by stirring at room temperature. There were then added 120 g. (1 mole) of chloroacetone cyanohydrin and the mixture warmed at 50° C. in a water bath until a test sample showed the product to be water-soluble. The light amber, viscous solution (1 kilogram) was found to contain 14.5% by weight of solids. (This solution can be used directly in coating by varying the reaction solvent to get the desired solids content.) A sample was precipitated in diethyl ether and dried for analysis. The product contained by weight 62.0% of carbon, 7.0% of hydrogen, 9.5% of nitrogen and 11.7% of chlorine compared with calculated theory for $C_{11}H_{13}N_2OCl$ of 58.7%, 5.7%, 12.4% and 15.7%, respectively. This result indicated that the product consisted of approximately 75% by weight of recurring 4-vinylpyridinium chloroacetone cyanohydrin units of the following structure:

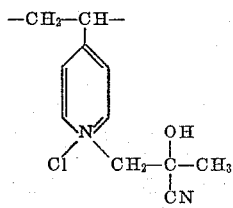

the remainder of the polymer molecule being residual recurring 4-vinylpyridine units.

In place of the chloroacetone cyanohydrin in the above example, there was substituted an equivalent amount of bromoacetone cyanohydrin to give a product containing about 90% by weight of recurring 4-vinylpyridinium bromoacetone cyanohydrin units represented by the following structure:

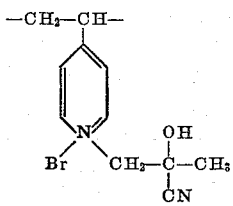

the remainder of the polymer molecule being residual recurring 4-vinylpyridine units.

Also, in place of the poly-4-vinylpyridine in the above example, there may be substituted a like amount of any other of the mentioned homopolymers such as poly-2-vinylpyridine, poly-3-vinylpyridine, 2-methyl-5-vinylpyridine, etc. to give resinous quaternary salts having generally similar antistatic characteristics and usefulness, i.e., the structural units will be the same as illustrated in the above example, except that the pyridyl group is attached through a different nuclear carbon atom to a carbon of the vinyl chain.

EXAMPLE 2

This example illustrates the antistatic properties of photographic films coated with the polymeric salts of the invention.

In each instance, the polymeric salt was dissolved in a mixture of acetone-methanol in a concentration varying from about 0.75–2.00 percent by weight of the polymeric salt, and the solution was then applied as a backing to a sheet of cellulose acetate film base by means of a dip roller and dried. The film was then further coated on the reverse side with a suitable subbing layer and a gelatino-silver halide emulsion. The following table lists the polymeric salt therein, and the conductivity of the coated films.

Table

| Polymeric Salt | Solvent, wt. ratios | Concentration, wt. percent | Conductivity X $10^{-10}$ mho |
|---|---|---|---|
| Product of Example 1 | 20 acetone / 80 methanol | 0.75 | 0.4 |
| Do | 20 acetone / 80 methanol | 2.00 | 0.3 |

Since conductivities of the order greater than $10^{-10}$ mho have been found to alleviate difficulties from static electricity generated in the normal handling of photographic film, it will be seen from the above table that the use of the polymeric salts of the invention in somewhat larger concentrations in the said solvent combinations as coatings would be expected to give films which are practically free from troublesome static effects.

The conductivity measurements for the above table were carried out by placing two parallel electrodes on the film at a fixed relative humidity of 50 percent; these electrodes are long compared to the distance between them, so as to avoid end effects. The observed reading is divided by the distance between electrodes and multiplied by their length, to obtain the surface resistivity in ohms, the conductivity being the reciprocal thereof.

While the polymeric salts of the invention have been illustrated primarily in connection with their use as antistatic coatings for light-sensitive photographic films, it will be understood that coatings thereof are also efficacious in the prevention of static build up and adhesion when coated on non-sensitized surfaces such as various natural and synthetic wrapping materials. They also have utility for textile antistatic treatment and as dispersing or wetting agents. Also, various filters, dyes, softeners, etc. can be incorporated, if desired, into the coating compositions of the invention.

What we claim is:

1. An antistatic photographic film comprising a transparent, flexible organic film support having thereon at least one light-sensitive silver halide emulsion layer, the said film having in one outer stratum thereof, a quaternary salt of a resinous C-vinylpyridine polymer consisting of not less than 70% by weight of polymerized units of the general structure:

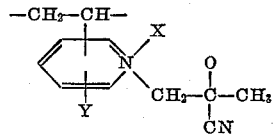

and not more than 30% by weight of polymerized units of the general structure:

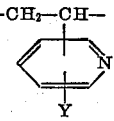

wherein Y represents a member selected from the group consisting of a hydrogen atom and an alkyl group of from 1 to 4 carbon atoms and X represents a member selected from the group consisting of a chlorine atom and a bromine atom.

2. An antistatic photographic film comprising a cellulose carboxylic ester support having on one side thereon at least one light-sensitive silver halide emulsion layer and on the opposite side of the said support, a layer comprising a quaternated, resinous 4-vinylpyridine polymer consisting of at least 70% by weight of quaternated, polymerized units of the general structure:

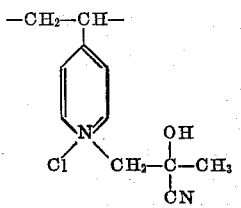

and not more than 30% by weight of non-quaternated, polymerized 4-vinylpyridine units.

3. An antistatic photographic film comprising a cellulose carboxylic ester support having on one side thereon at least one light-sensitive silver halide emulsion layer and on the opposite side of the said support a quaternated, resinous 4-vinylpyridine polymer consisting of at least 70% by weight of quaternated polymerized units of the general structure:

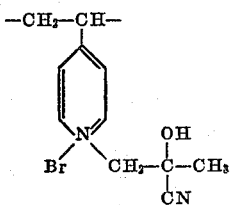

and not more than 30% by weight of non-quaternated, polymerized 4-vinylpyridine units.

4. The antistatic photographic film according to claim 1 wherein the said support material is cellulose acetate.

5. The antistatic photographic film according to claim 2 wherein the said support is cellulose acetate.

6. The antistatic photographic film according to claim 3 wherein the said support is cellulose acetate.

References Cited in the file of this patent

UNITED STATES PATENTS

| 2,484,430 | Sprague et al. | Oct. 11, 1949 |
| 2,548,564 | Sprague et al. | Apr. 10, 1951 |
| 2,612,446 | Umberger | Sept. 30, 1952 |
| 2,623,013 | D'Alelio | Dec. 23, 1952 |
| 2,717,834 | Saner | Sept. 13, 1955 |
| 2,725,297 | Morey | Nov. 29, 1955 |
| 2,741,568 | Hayek | Apr. 10, 1956 |
| 2,843,573 | Melamed | July 15, 1958 |